United States Patent
Ito

(10) Patent No.: US 11,499,210 B2
(45) Date of Patent: Nov. 15, 2022

(54) HEAT EXCHANGER AND METHOD OF MANUFACTURING THEREOF, AND REFRIGERATION CYCLE APPARATUS

(71) Applicant: Mitsubishi Electric Corporation, Tokyo (JP)

(72) Inventor: Daisuke Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/464,035

(22) PCT Filed: Dec. 21, 2016

(86) PCT No.: PCT/JP2016/088115
§ 371 (c)(1),
(2) Date: May 24, 2019

(87) PCT Pub. No.: WO2018/116408
PCT Pub. Date: Jun. 28, 2018

(65) Prior Publication Data
US 2019/0382873 A1   Dec. 19, 2019

(51) Int. Cl.
*F28F 1/12* (2006.01)
*F28F 19/06* (2006.01)
(Continued)

(52) U.S. Cl.
CPC .............. *C22C 21/10* (2013.01); *F28F 13/18* (2013.01); *F28F 19/06* (2013.01)

(58) Field of Classification Search
CPC ........ F28F 19/02; F28F 19/06; F28F 2275/04; F28F 2275/05; F28F 1/126; F28F 1/24;
(Continued)

(56) References Cited

U.S. PATENT DOCUMENTS 3,731,732 A * 5/1973 Awe ............... B21D 53/085
165/181
5,277,358 A * 1/1994 Cottone ............ B23K 1/0012
148/531
(Continued)

FOREIGN PATENT DOCUMENTS

CN    1997271 A       7/2007
DE    102014217075 A1  3/2016
(Continued)

OTHER PUBLICATIONS

International Search Report of the International Searching Authority dated Mar. 21, 2017 for the corresponding international application No. PCT/JP2016/088115 (and English translation).
(Continued)

*Primary Examiner* — Frantz F Jules
*Assistant Examiner* — Jason N Thompson
(74) *Attorney, Agent, or Firm* — Posz Law Group, PLC

(57) ABSTRACT

There are provided a heat exchanger having a flat tube and a fin bonded together, without causing melting of a coating material covering the fin, and a method of manufacturing thereof. A heat exchanger includes: a flat tube having a flat cross-sectional shape and covered with an anticorrosive layer; and a fin bonded to the flat tube with a bonding agent on a first surface of the anticorrosive layer interposed therebetween, and covered with a coating material, the first surface of the anticorrosive layer having been roughened, and the bonding agent being fixed to the roughened first surface.

5 Claims, 15 Drawing Sheets

(51) Int. Cl.
  *F28F 21/08* (2006.01)
  *F28F 1/32* (2006.01)
  *F28F 1/30* (2006.01)
  *F28F 1/24* (2006.01)
  *F28F 19/02* (2006.01)
  *C22C 21/10* (2006.01)
  *F28F 13/18* (2006.01)

(58) Field of Classification Search
  CPC .... F28F 1/30; F28F 1/32; F28F 21/089; F28F 2275/025; F28F 2275/02; F28F 1/128; C22C 21/10
  USPC .......................................................... 165/133
  See application file for complete search history.

(56) References Cited

U.S. PATENT DOCUMENTS

| | | | | |
|---|---|---|---|---|
| 5,295,302 | A * | 3/1994 | Takai | B21C 37/14 228/183 |
| 5,490,559 | A | 2/1996 | Dinulescu | |
| 6,176,959 | B1 | 1/2001 | Clarke | |
| 6,186,222 | B1 * | 2/2001 | Doko | B23K 35/288 148/24 |
| 6,397,939 | B1 * | 6/2002 | Swiger | F28D 1/05383 165/153 |
| 7,431,074 | B1 | 10/2008 | Fellman et al. | |
| 2007/0251091 | A1 * | 11/2007 | Minami | F28D 1/05391 29/890.054 |
| 2009/0008068 | A1 * | 1/2009 | Minami | F28F 13/18 165/133 |
| 2009/0242177 | A1 * | 10/2009 | Morioka | C09D 5/1637 165/133 |
| 2009/0307907 | A1 * | 12/2009 | Carl | F28F 1/126 29/890.046 |
| 2010/0012308 | A1 * | 1/2010 | Scheidegger | F28F 19/06 165/182 |
| 2010/0024351 | A1 * | 2/2010 | Pope | E04B 1/3431 52/745.02 |
| 2010/0175863 | A1 * | 7/2010 | Denoual | F28F 1/025 165/181 |
| 2011/0232881 | A1 * | 9/2011 | Downing | H05K 7/20454 165/133 |
| 2012/0227945 | A1 * | 9/2012 | Taras | F28F 17/005 165/172 |
| 2013/0043013 | A1 * | 2/2013 | Iino | F28F 21/089 165/181 |
| 2013/0212881 | A1 | 8/2013 | Kamoshida et al. | |
| 2013/0327512 | A1 * | 12/2013 | Brotz | F28F 1/126 165/181 |
| 2014/0054017 | A1 * | 2/2014 | Takahashi | F28F 1/128 165/172 |
| 2015/0060035 | A1 * | 3/2015 | Furumura | B23K 35/0272 165/180 |
| 2017/0160023 | A1 * | 6/2017 | Schiehlen | F28F 9/162 |

FOREIGN PATENT DOCUMENTS

| | | | |
|---|---|---|---|
| EP | 0 823 296 A2 | 2/1998 | |
| EP | 0 907 064 A2 | 4/1999 | |
| JP | H06-221787 A | 8/1994 | |
| JP | H10-246592 A | 9/1998 | |
| JP | 2001-280891 A | 10/2001 | |
| JP | 2003-001409 A | 1/2003 | |
| JP | 2004-042059 A | 2/2004 | |
| JP | 2005-207728 A | 8/2005 | |
| JP | 2007-051787 A | 3/2007 | |
| JP | 2008-256236 A | 10/2008 | |
| JP | 2009-150587 A | 7/2009 | |
| JP | 2009-250510 A | 10/2009 | |
| JP | 2012-073014 A | 4/2012 | |
| JP | 2012-241973 A | 12/2012 | |
| JP | 2013-250016 A | 12/2013 | |
| JP | 2016-031158 A | 3/2016 | |
| JP | 2016-130603 A | 7/2016 | |
| JP | 2016-183787 A | 10/2016 | |
| WO | WO-2015032631 A1 * | 3/2015 | ........... F28D 9/0062 |
| WO | WO-2015122185 A1 * | 8/2015 | ............. F28F 3/025 |

OTHER PUBLICATIONS

Extended European Search Report dated Nov. 26, 2019 issued in corresponding EP patent application No. 16924289.8.
Office Action dated May 12, 2020 issued in corresponding JP patent application No. 2018-557455 (and English translation).
Office Action dated Apr. 24, 2020 issued in corresponding CN patent application No. 201680091596.8 (and English translation).
Office Action dated Mar. 4, 2022 issued in corresponding EP Patent Application No. 16 924 289.8.

* cited by examiner

HEAT EXCHANGER AND METHOD OF MANUFACTURING THEREOF, AND REFRIGERATION CYCLE APPARATUS

CROSS REFERENCE TO RELATED APPLICATIONS

This application is a U.S. national stage application of PCT/JP2016/088115 filed on Dec. 21, 2016, the contents of which are incorporated herein by reference.

TECHNICAL FIELD

The present invention relates to heat exchangers and methods of manufacturing thereof, and refrigeration cycle apparatuses, and more particularly to a heat exchanger having a fin bonded to a heat transfer tube, a method of manufacturing the heat exchanger, and a refrigeration cycle apparatus including such a heat exchanger.

BACKGROUND ART

In one type of air conditioner such as a car air conditioner, a heat exchanger having a combination of a flat tube and a corrugated fin is used. The flat tube is a form of heat transfer tube through which refrigerant flows, which has a flat cross-sectional shape so as to achieve efficient heat transfer. The corrugated fin is a fin formed by bending a plate-like fin into a bellows shape.

A plurality of flat tubes are spaced from one another in the minor axis direction of the flat tubes. Each of the plurality of flat tubes is disposed such that the major axis of the flat tube is along a direction of air flow. A plurality of corrugated fins are disposed such that one corrugated fin is disposed between one flat tube and another flat tube adjacent to and spaced from each other.

Peak portions of a bellows-shaped fin facing one flat tube are joined to the one flat tube. Peak portions of the bellows-shaped fin facing another flat tube are joined to the another flat tube. The flat tubes and the bellows-shaped fin are conventionally joined by brazing. The brazing is performed under a relatively high temperature condition of approximately 600° C., for example.

CITATION LIST

Patent Literature

PTL 1: Japanese Patent Laying-Open No. 2016-130603
PTL 2: Japanese Patent Laying-Open No. 2012-73014
PTL 3: Japanese Patent Laying-Open No. 2003-1409
PTL 4: Japanese Patent Laying-Open No. 2005-207728

SUMMARY OF INVENTION

Technical Problem

A heat exchanger is required, when dew adheres to its fin, to spread and discharge the dew to the outside of the heat exchanger without causing scattering of the dew. In particular, it is strongly required of a fin of an indoor heat exchanger not to cause scattering of dew into a room. It is also required that a surface of the fin not be contaminated. Accordingly, the surface of a fin including a corrugated fin is covered with a coating material having at least hydrophilic property and antifouling property.

However, the coating material covering the surface of the fin melts by heat (approximately 600° C.) during brazing. There have thus been proposed various methods of joining a fin to a flat tube while preventing a coating material from melting (PTL 1, PTL 2, PTL 3 and PTL 4).

The present invention has been made as part of efforts to develop such a heat exchanger. An object of the present invention is to provide a heat exchanger having a flat tube and a fin bonded together, without causing melting of a coating material covering the fin. Another object is to provide a method of manufacturing such a heat exchanger. Yet another object is to provide a refrigeration cycle apparatus including such a heat exchanger.

Solution to Problem

A heat exchanger according to the present invention includes a flat tube and a fin. The flat tube has a flat cross-sectional shape, and is covered with an anticorrosive layer. The fin is bonded to the flat tube with a bonding agent on a first surface of the anticorrosive layer interposed therebetween, and covered with a coating material. The first surface of the anticorrosive layer has been roughened. The bonding agent is fixed to the roughened first surface.

A method of manufacturing a heat exchanger according to the present invention includes the following steps. A flat tube having a flat cross-sectional shape and covered with an anticorrosive layer is prepared. A fin covered with a coating material is prepared. A roughening process is performed on a first surface of the anticorrosive layer of the flat tube. A bonding agent is fixed to the first surface of the anticorrosive layer that has been subjected to the roughening process. The fin is brought into contact with the bonding agent. The fin is pressed toward the flat tube, while the flat tube is pressed toward the fin. Heat treatment is conducted while the flat tube and the fin are being pressed.

A refrigeration cycle apparatus according to the present invention is a refrigeration cycle apparatus including the heat exchanger described above.

Advantageous Effects of Invention

According to the heat exchanger of the present invention, the fin is bonded to the flat tube with the bonding agent on the first surface of the anticorrosive layer interposed therebetween, so that the heat exchanger in which the coating material covering the fin does not melt is obtained.

According to the method of manufacturing a heat exchanger of the present invention, the fin can be bonded to the flat tube without causing melting of the coating material covering the fin.

According to the refrigeration cycle apparatus of the present invention, scattering of water droplets, soil or the like into a room can be suppressed by including the heat exchanger described above.

DESCRIPTION OF EMBODIMENTS

First Embodiment

Figure 1:
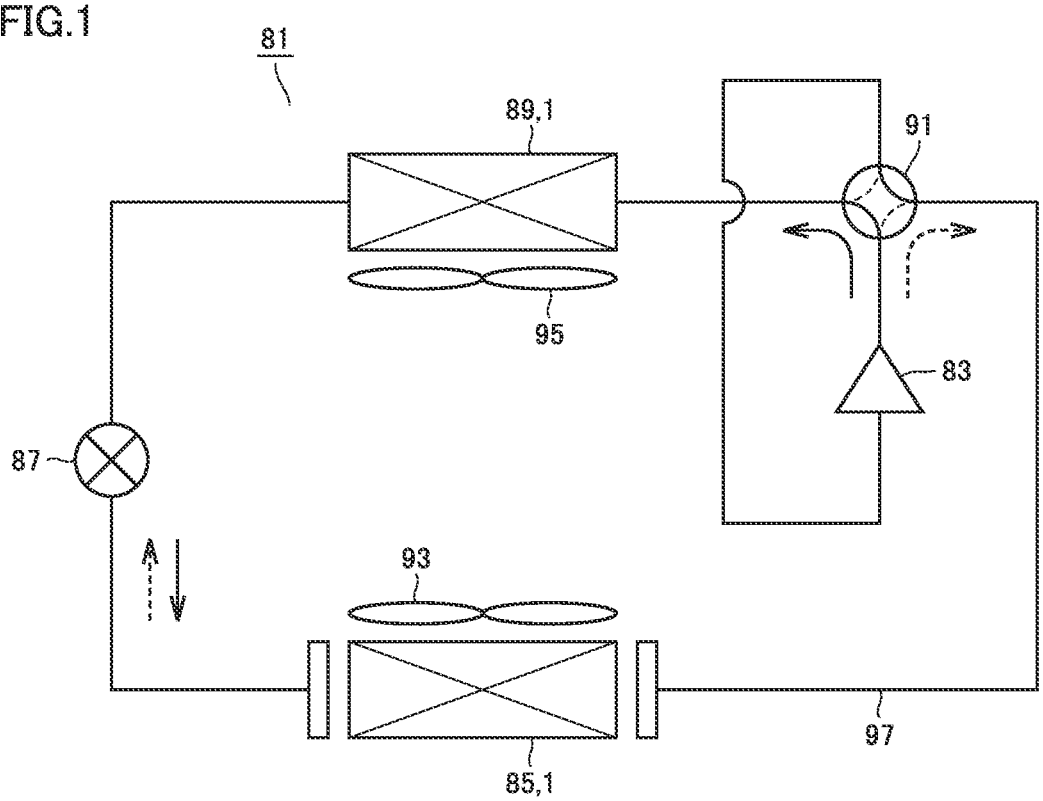
FIG. 1 shows a refrigerant circuit of an air conditioner including a heat exchanger according to each embodiment.

First, an air conditioner (refrigerant circuit) is described as an exemplary refrigeration cycle apparatus including a heat exchanger according to each embodiment. As shown in FIG. 1, an air conditioner 81 includes a compressor 83, a four-way valve 91, an indoor unit 89, an expansion valve 87 and an outdoor unit 85. Compressor 83, four-way valve 91, indoor unit 89, expansion valve 87 and outdoor unit 85 are connected together by a refrigerant pipe 97.

Outdoor unit 85 includes a heat exchanger 1 disposed therein. Outdoor unit 85 also includes an outdoor fan 93 provided therein for forcibly feeding outdoor air into heat exchanger 1. Heat exchange takes place between the outdoor air forcibly fed into and passing through heat exchanger 1, and refrigerant flowing through heat exchanger 1 (flat tube).

Indoor unit 89 includes a heat exchanger 1 disposed therein. Indoor unit 89 also include an indoor fan 95 provided therein for forcibly feeding indoor air into heat exchanger 1. Heat exchange takes place between the indoor air forcibly fed into and passing through heat exchanger 1, and refrigerant flowing through heat exchanger 1 (flat tube).

Operation of air conditioner 81 includes cooling operation, heating operation and defrosting operation. The cooling operation is an operation for cooling the indoor air. The heating operation is an operation for heating the indoor air. The defrosting operation is an operation for melting frost and the like which have adhered to heat exchanger 1 of outdoor unit 85.

In air conditioner 81, a refrigerant flow path is switched by four-way valve 91 depending on the cooling operation, the heating operation and the defrosting operation. In the cooling operation and the defrosting operation, the refrigerant discharged from compressor 83 is fed into outdoor unit 85 (heat exchanger 1), and the refrigerant that has flown through indoor unit 89 (heat exchanger 1) is returned to compressor 83 (see dotted line arrows). In the heating operation, on the other hand, the refrigerant discharged from compressor 83 is fed into indoor unit 89 (heat exchanger 1), and the refrigerant that has flown through outdoor unit 85 (heat exchanger 1) is returned to compressor 83 (see solid line arrows).

Each operation is described in further detail. First, in the cooling operation, heat exchanger 1 of outdoor unit 85 serves as a condenser, and heat exchanger 1 of indoor unit 89 serves as an evaporator. By driving compressor 83, high-temperature and high-pressure gaseous refrigerant is discharged from compressor 83. The discharged high-temperature and high-pressure gas refrigerant (single phase) flows through four-way valve 91 into heat exchanger 1 of outdoor unit 85. In that heat exchanger 1, heat exchange takes place between the refrigerant that has flown therein and the air fed into outdoor unit 85, causing the high-temperature and high-pressure gas refrigerant to condense into high-pressure liquid refrigerant (single phase).

The high-pressure liquid refrigerant fed from outdoor unit 85 (heat exchanger 1) is turned, by expansion valve 87, into refrigerant in a two-phase state of low-pressure gas refrigerant and liquid refrigerant. The refrigerant in a two-phase state flows into heat exchanger 1 of indoor unit 89. In that heat exchanger 1, heat exchange takes place between the refrigerant in a two-phase state that has flown therein and the air fed into indoor unit 89, causing the refrigerant in a two-phase state into low-pressure gas refrigerant (single phase) due to evaporation of its liquid refrigerant. The room interior is cooled by this heat exchange. The low-pressure gas refrigerant fed from indoor unit 89 (heat exchanger 1) flows through four-way valve 91 into compressor 83. The low-pressure gas refrigerant that has flown therein is compressed into high-temperature and high-pressure gas refrigerant, and discharged from compressor 83 again. This cycle is repeated thereafter.

Next, in the heating operation, heat exchanger 1 of outdoor unit 85 serves as an evaporator, and heat exchanger 1 of indoor unit 89 serves as a condenser. By driving compressor 83, high-temperature and high-pressure gaseous refrigerant is discharged from compressor 83. The discharged high-temperature and high-pressure gas refrigerant (single phase) flows through four-way valve 91 into heat exchanger 1 of indoor unit 89. In that heat exchanger 1, heat exchange takes place between the gas refrigerant that has flown therein and the air fed into indoor unit 89, causing the high-temperature and high-pressure gas refrigerant to condense into high-pressure liquid refrigerant (single phase). The room interior is heated by this heat exchange.

The high-pressure liquid refrigerant fed from indoor unit 89 (heat exchanger 1) is turned, by expansion valve 87, into refrigerant in a two-phase state of low-pressure gas refrigerant and liquid refrigerant. The refrigerant in a two-phase state flows into heat exchanger 1 of outdoor unit 85. In that heat exchanger 1, heat exchange takes place between the refrigerant in a two-phase state that has flown therein and the air fed into outdoor unit 85, causing the refrigerant in a two-phase state into low-pressure gas refrigerant (single phase) due to evaporation of its liquid refrigerant. The low-pressure gas refrigerant fed from outdoor unit 85 (heat exchanger 1) flows through four-way valve 91 into compressor 83. The low-pressure gas refrigerant that has flown therein is compressed into high-temperature and high-pressure gas refrigerant, and discharged from compressor 83 again. This cycle is repeated thereafter.

In this heating operation, since heat exchanger 1 of outdoor unit 85 serves as an evaporator, moisture contained in the outdoor air may turn into frost and adhere to heat exchanger 1. Once the frost has adhered to heat exchanger 1 of outdoor unit 85, a flow of the outdoor air trying to pass through that heat exchanger 1 is hindered. Thus, satisfactory heat exchange between the outdoor air and the refrigerant flowing through heat exchanger 1 is not performed, resulting in degraded heating efficiency of air conditioner 81. To avoid this, in air conditioner 81, once frost has adhered to heat exchanger 1 of outdoor unit 85 to a level equal to or above a certain level, the heating operation is suspended, and the defrosting operation is performed for melting the frost that has adhered to heat exchanger 1.

In the defrosting operation, the actions of outdoor fan 93 and indoor fan 95 are stopped. A flow of the refrigerant in the defrosting operation is the same as the flow of the refrigerant in the cooling operation. When the defrosting operation is started, high-temperature and high-pressure gaseous refrigerant discharged from compressor 83 is fed through four-way valve 91 into heat exchanger 1 of outdoor unit 85. In that heat exchanger 1, heat of the gaseous refrigerant is dissipated, causing the frost that has adhered to heat exchanger 1 to melt. Subsequently, the refrigerant flows from outdoor unit 85 to expansion valve 87 and indoor unit 89, and is returned to compressor 83. This cycle is repeated thereafter until the frost that has adhered to heat exchanger 1 is removed.

Next, the structure of heat exchanger 1 disposed in each of indoor unit 89 and outdoor unit 85 is described.

Figure 2:
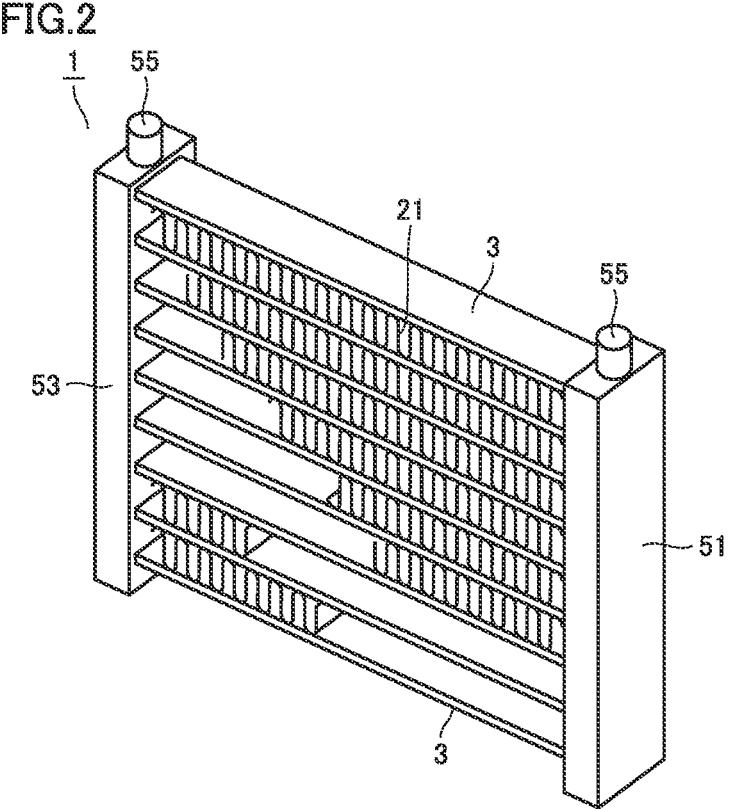
FIG. 2 is a perspective view of the heat exchanger according to a first embodiment.
Figure 3:
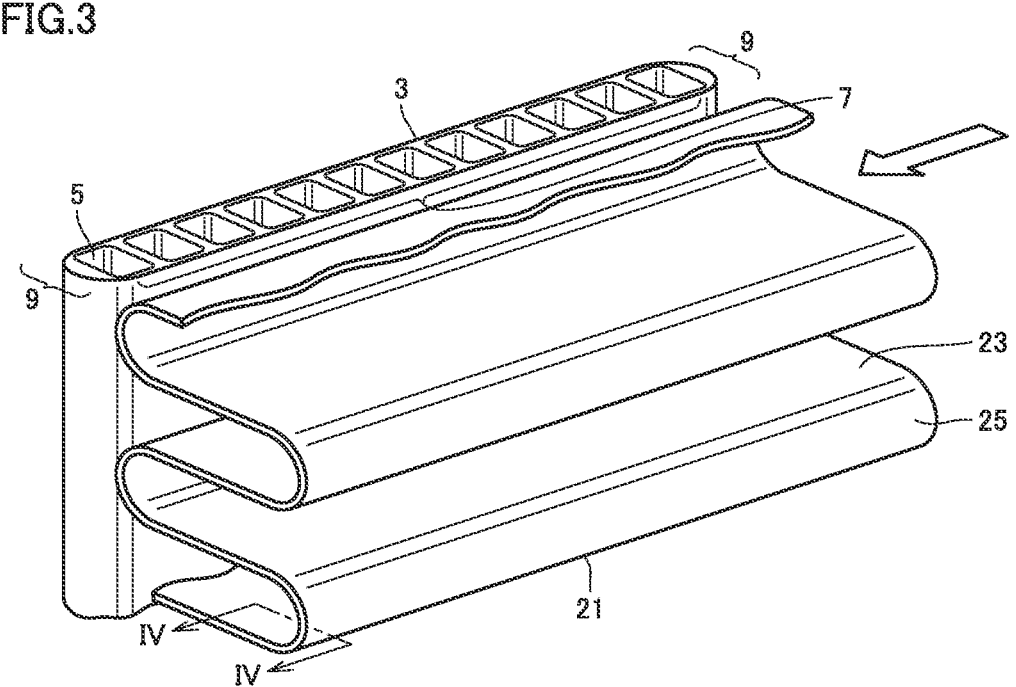
FIG. 3 is a partial enlarged perspective view showing a portion where a corrugated fin and a flat tube are bonded together in the same embodiment.

As shown in FIGS. 2 and 3, heat exchanger 1 includes a plurality of flat tubes 3 (heat transfer tubes), a plurality of corrugated fins 21 (fins), an inlet side header 51 and an outlet side header 53. The plurality of flat tubes 3 are substantially horizontally disposed, and are vertically spaced from one another. Each flat tube 3 is provided with an outer wall planar portion 7 and an outer wall curved portion 9. A plurality of refrigerant flow paths 5 through which the refrigerant flows are formed at a distance from one another within flat tube 3.

Inlet side header 51 is disposed at one end side in a longitudinal direction of the plurality of flat tubes 3, and outlet side header 53 is disposed at the other end side in the longitudinal direction. Inlet side header 51 is provided with a refrigerant inlet/outlet 55. Outlet side header 53 is provided with a refrigerant inlet/outlet 55. For example, the refrigerant that has flown in through refrigerant inlet/outlet 55 of inlet side header 51 flows through flat tubes 3 and is transferred to outlet side header 53. The refrigerant that has flown in through refrigerant inlet/outlet 55 of outlet side header 53, on the other hand, flows through flat tubes 3 and is transferred to inlet side header 51.

Figure 4:
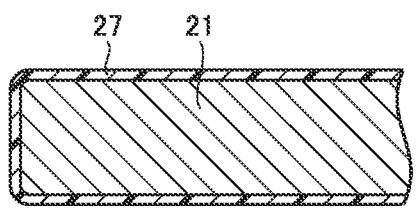
FIG. 4 is a partial cross-sectional view of the corrugated fin taken along the cross-sectional line IV-IV shown in FIG. 3 in the same embodiment.

Each corrugated fin 21 is disposed between one flat tube 3 and another flat tube 3 vertically adjacent to each other. Corrugated fin 21 is a fin formed by bending a plate-like fin into a bellows shape. Here, corrugated fin 21 has a curved portion 25 and a planar portion 23. As shown in FIG. 4, the surface of corrugated fin 21 is covered with a coating material 27 having at least hydrophilic property and antifouling property.

Figure 5:
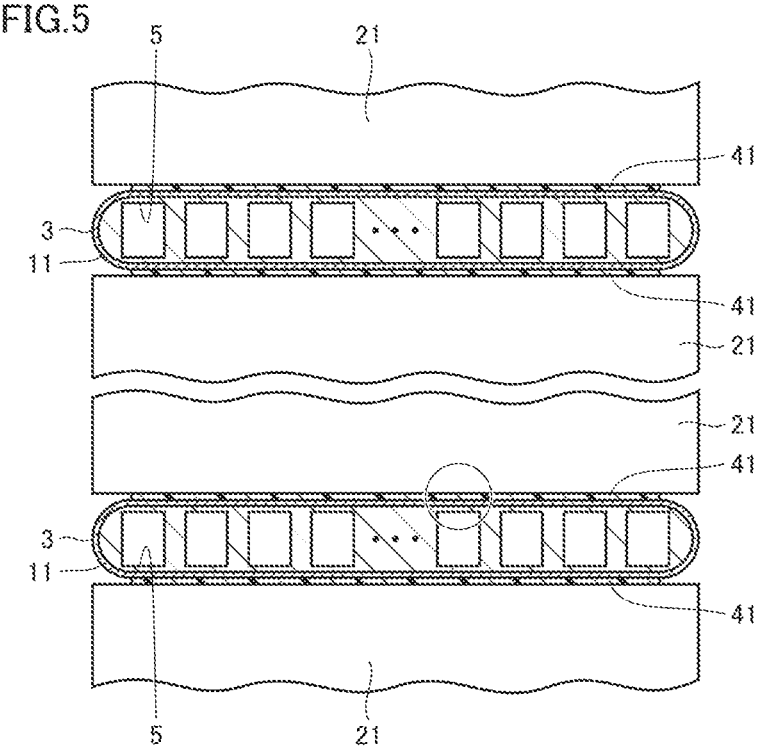
FIG. 5 is a side view including a partial cross section, showing the portion where the corrugated fin and the flat tube are bonded together in the same embodiment.

As shown in FIGS. 3 and 5, a peak portion (curved portion 25) of corrugated fin 21 facing one flat tube 3 is bonded with an adhesive 41 to outer wall planar portion 7 of the one flat tube 3. A peak portion (curved portion 25) of corrugated fin 21 facing another flat tube 3 is bonded with adhesive 41 to outer wall planar portion 7 of the another flat tube 3. Here, an epoxy-based adhesive is applied, for example, as adhesive 41.

Figure 6:
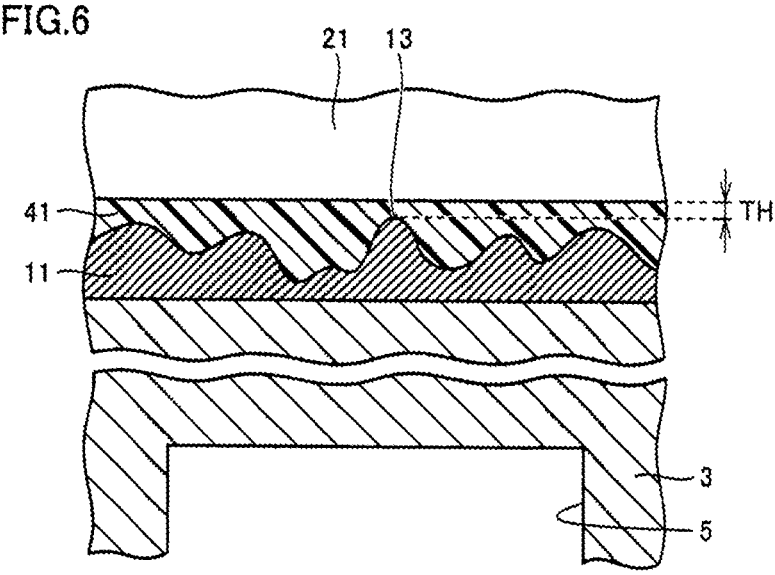
FIG. 6 is a partial enlarged cross-sectional view inside a circle shown in FIG. 5 in the same embodiment.

As shown in FIG. 6, flat tube 3 is covered with an anticorrosive layer 11 made of an alloy layer of aluminum and zinc, for example. The surface of anticorrosive layer 11 has been subjected to a roughening process. Roughened anticorrosive layer 11 has an arithmetic mean roughness of not less than 0.7 μm and not more than 100 μm. When the arithmetic mean roughness is lower than 0.7 μm, adequate bonding strength between adhesive 41 and flat tube 3 (anticorrosive layer 11) cannot be obtained. On the other hand, since anticorrosive layer 11 has an initial thickness of approximately 100 μm, when the arithmetic mean roughness exceeds 100 μm, anticorrosive layer 11 will be penetrated, thus increasing the possibility of corrosion of flat tube 3.

A distance TH from the top 13 of the roughened surface of anticorrosive layer 11 to an upper surface of adhesive 41 (the thickness of adhesive 41) is not less than 0.1 μm and not more than 5.0 μm. When the thickness of adhesive 41 is smaller than 0.1 μm, it is difficult to control the distribution (thickness) of adhesive 41 applied to flat tube 3, possibly resulting in variation in bonding state after the bonding. When the thickness of adhesive 41 exceeds 5.0 μm, on the other hand, thermal conduction between flat tube 3 and corrugated fin 21 is more likely to be hindered. There is also a risk of an outflow of the adhesive during the bonding. Heat exchanger 1 according to the first embodiment is configured as described above.

Figure 7:
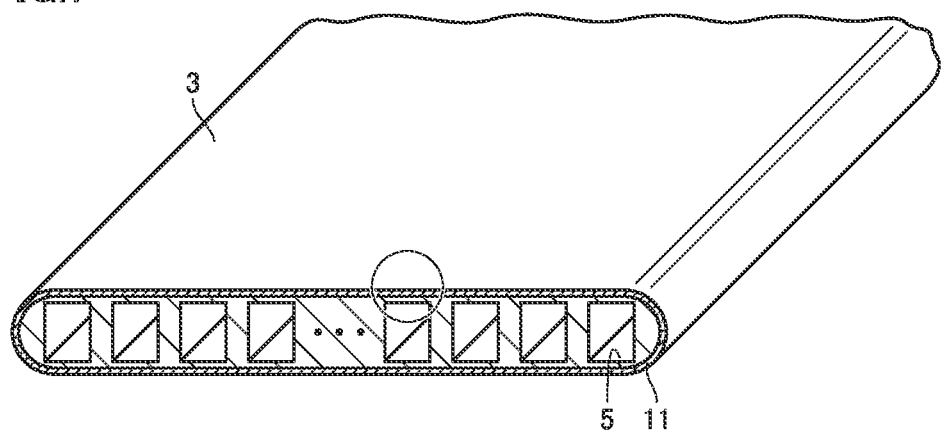
FIG. 7 is a partial perspective view including a partial cross section, showing a step of a method of manufacturing the heat exchanger shown in FIG. 2 in the same embodiment.
Figure 8:
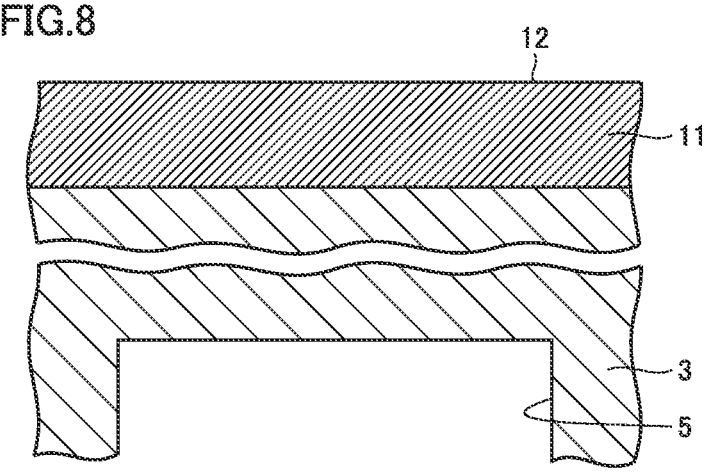
FIG. 8 is a partial enlarged cross-sectional view inside a circle shown in FIG. 7 in the same embodiment.

Next, an exemplary method of manufacturing heat exchanger 1 described above is described. First, flat tube 3 is prepared as shown in FIGS. 7 and 8. The surface of flat tube 3 is covered with anticorrosive layer 11. Anticorrosive layer 11 has a thickness of approximately 100 μm. At this point in time, an anticorrosive layer surface 12 has an arithmetic mean surface roughness of approximately between 0.2 μm and 0.5 μm.

Figure 9:
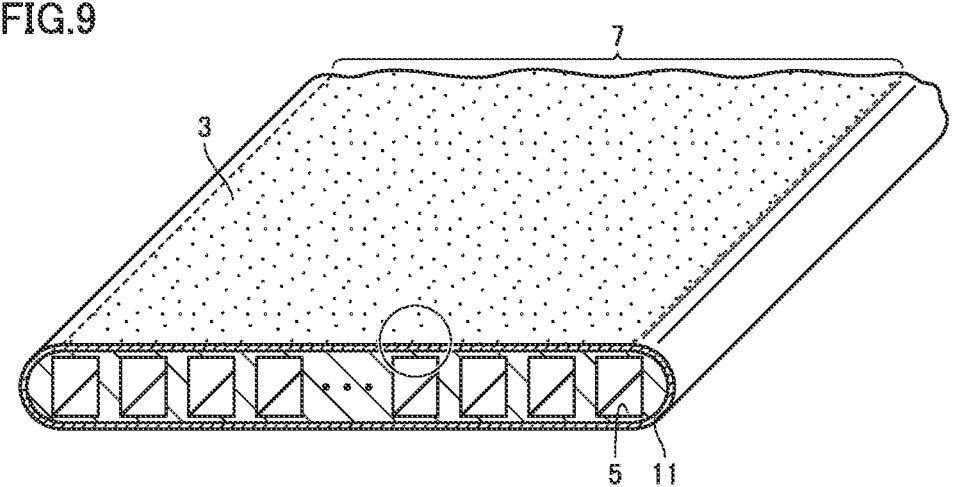
FIG. 9 is a partial perspective view including a partial cross section, showing a step performed after the step shown in FIG. 7 in the same embodiment.
Figure 10:
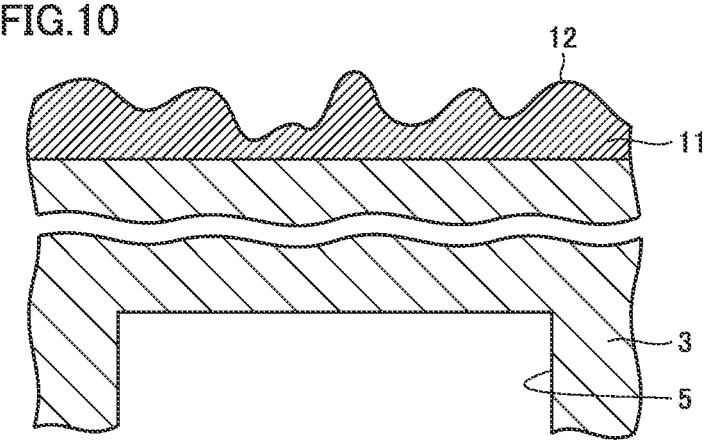
FIG. 10 is a partial enlarged cross-sectional view inside a circle shown in FIG. 9 in the same embodiment.

Next, a blasting process is performed on flat tube 3. As shown in FIGS. 9 and 10, fine sand is sprayed onto flat tube 3 to thereby roughen anticorrosive layer surface 12 located at outer wall planar portion 7. Here, anticorrosive layer surface 12 is roughened so as to have an arithmetic mean surface roughness of not less than 0.7 μm and not more than 100 μm.

Figure 11:
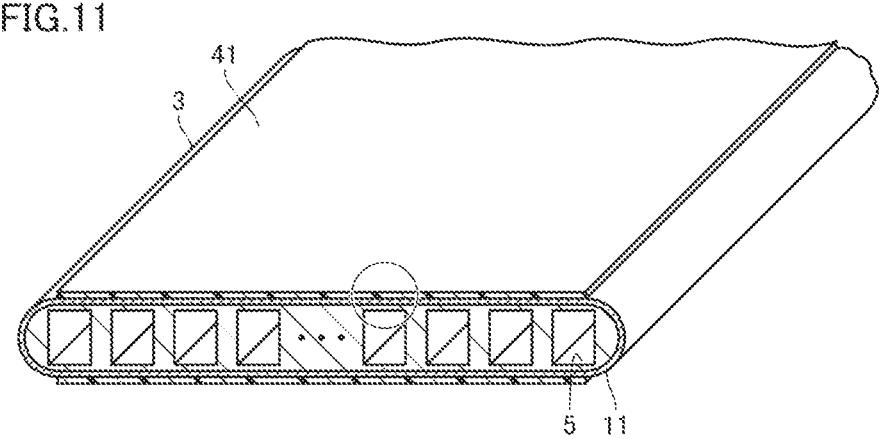
FIG. 11 is a partial perspective view including a partial cross section, showing a step performed after the step shown in FIG. 9 in the same embodiment.
Figure 12:
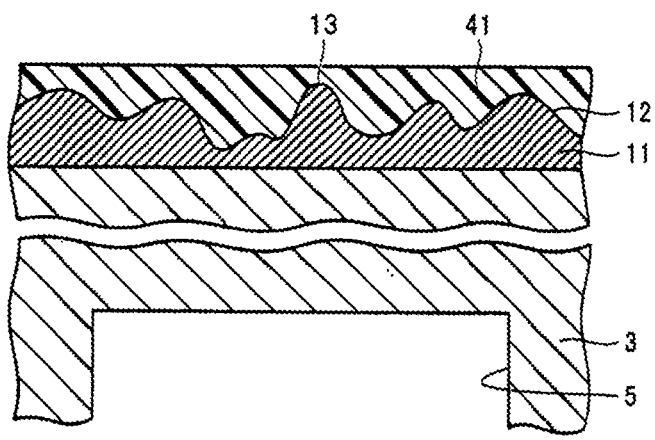
FIG. 12 is a partial enlarged cross-sectional view inside a circle shown in FIG. 11 in the same embodiment.

Next, as shown in FIGS. 11 and 12, adhesive 41 is applied (cladding) to the surface (outer wall planar portion 7) of flat tube 3 that has been subjected to the blasting process. Here, the adhesive is applied such that the distance from the top 13 of roughened anticorrosive layer surface 12 to the upper surface of adhesive 41 (the thickness of adhesive 41) is approximately 5 μm. The adhesive is applied by spraying adhesive 41 onto flat tube 3, for example. Alternatively, adhesive 41 may be applied to flat tube 3 by a roll (not shown).

Figure 13:
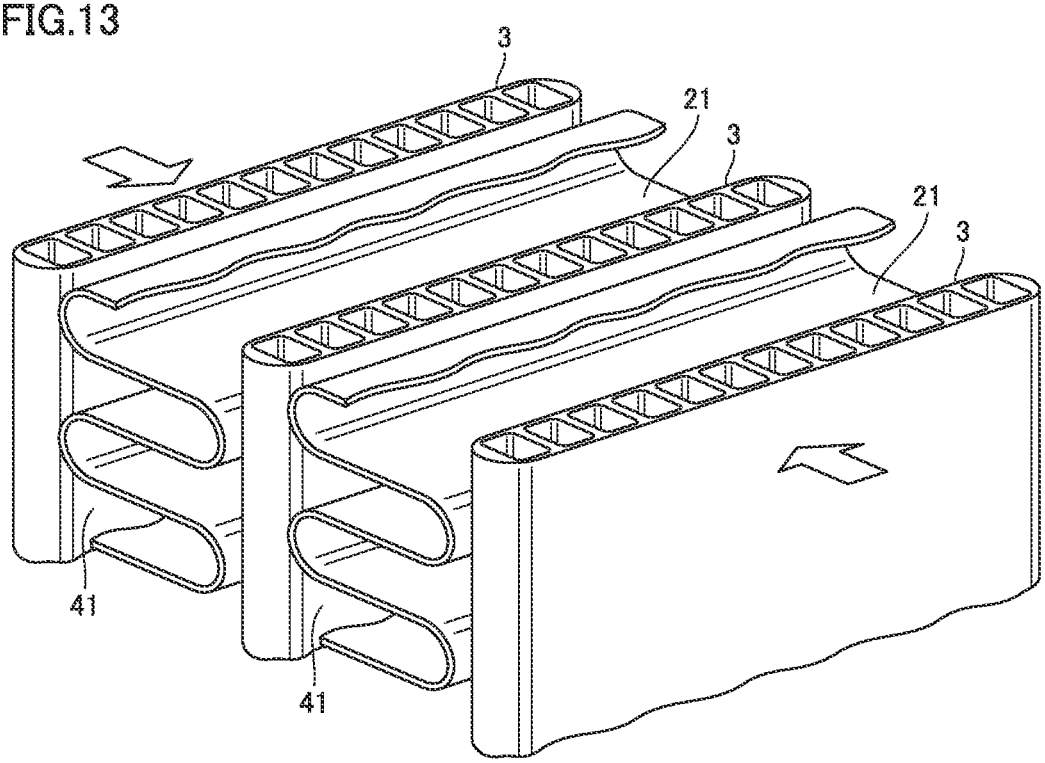
FIG. 13 is a partial perspective view including a partial cross section, showing a step performed after the step shown in FIG. 11 in the same embodiment.
Figure 14:
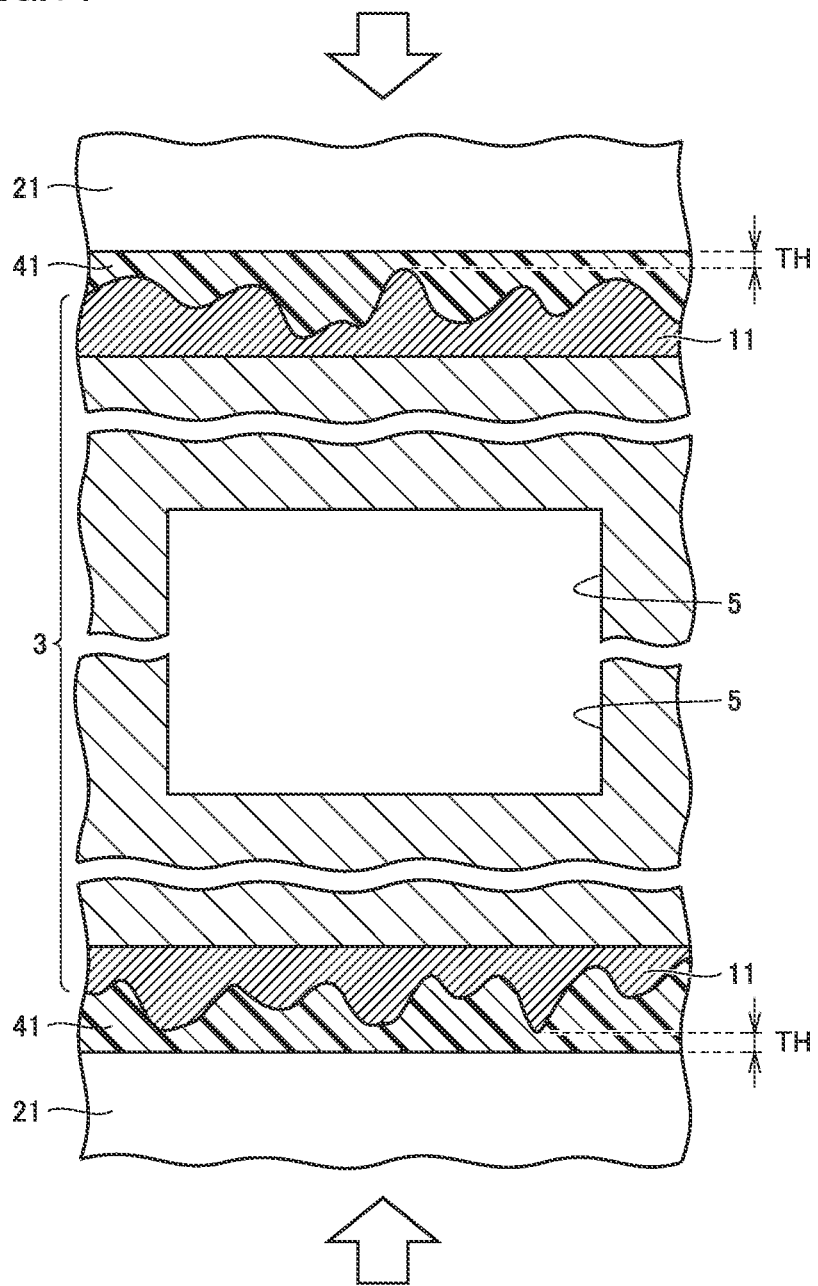
FIG. 14 is a partial enlarged side view including a partial cross section of the step shown in FIG. 13 in the same embodiment.
Figure 15:
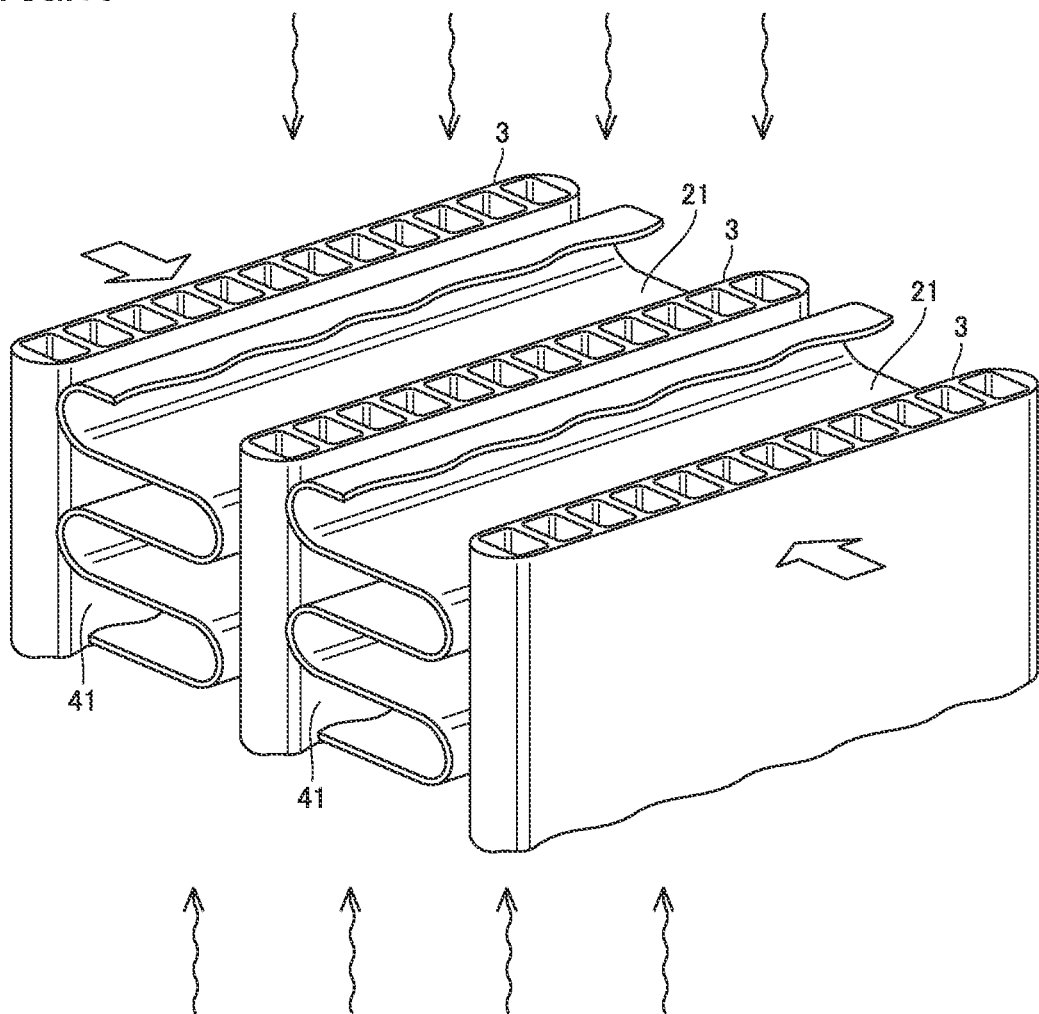
FIG. 15 is a partial perspective view including a partial cross section, showing a step performed after the step shown in FIG. 13 in the same embodiment.

Next, flat tubes 3 and corrugated fins 21 are bonded together. As shown in FIGS. 13 and 14, the plurality of flat tubes 3 and the plurality of corrugated fins 21 are disposed in such a manner that each corrugated fin 21 is sandwiched between one flat tube 3 and another flat tube 3 spaced from and adjacent to each other. Then, in this state, wires (not shown) are tied, for example, around the plurality of flat tubes 3 and the plurality of corrugated fins 21, to apply pressure in a direction in which corrugated fin 21 is sandwiched between the one flat tube 3 and the another flat tube 3 (see arrows).

Next, heat treatment is conducted under a temperature condition of approximately 200° C. (see wavy line arrows), while the pressure is being applied to the plurality of flat tubes 3 and the plurality of corrugated fins 21. As a result, corrugated fins 21 and flat tubes 3 are bonded together with adhesive 41, while corrugated fins 21 and flat tubes 3 are in close contact with each other. Here, since the temperature for the heat treatment is approximately 200° C., coating material 27 covering corrugated fin 21 does not melt, so that the hydrophilic property, antifouling property and the like of corrugated fin 21 are maintained.

The wires (not shown) are subsequently untied, to complete heat exchanger 1 having flat tubes 3 and corrugated fins 21 bonded together with adhesive 41 (see FIG. 2).

In heat exchanger 1 described above, first, anticorrosive layer 11 of flat tube 3 is subjected to the roughening process, and then adhesive 41 is sprayed onto or applied to the roughened surface of anticorrosive layer 11, to thereby fix adhesive 41 to flat tube 3 (cladding). Here, the thickness of adhesive 41 (distance TH from the top 13 of the roughened surface of anticorrosive layer 11 to the upper surface of adhesive 41) is at least not less than 0.1 μm. As a result, a uniform distribution (thickness) of adhesive 41 applied to flat tube 3 can be achieved.

Next, the heat treatment is conducted while pressure is being applied such that corrugated fin 21 is sandwiched between one flat tube 3 and another flat tube 3, to thereby bond flat tubes 3 and corrugated fin 21 together while corrugated fin 21 is in reliable contact with adhesive 41. As a result, a bonding ratio of flat tubes 3 and corrugated fins 21 can be improved. The bonding ratio means a ratio of the number of actual bonding portions to the number of all bonding portions.

Adhesive 41 has a lower melting point than base materials for flat tube 3 and corrugated fin 21. In addition, adhesive 41 is not diffused into these base materials and does not form a metallic bond, and therefore tends to have lower bonding power than common brazing.

In the method described above, adhesive 41 can be reliably fixed to the roughened surface of flat tube 3, and the bonding ratio of bonding corrugated fin 21 bonded to adhesive 41 reliably fixed to flat tube 3 can be increased, to thereby improve the bonding strength between corrugated fin 21 and flat tube 3. In addition, bonding failure during the manufacture of heat exchanger 1 can be suppressed to improve the productivity, thus contributing to reduction in production costs.

As described above, generally, a fin of a heat exchanger of an air conditioner is required to have hydrophilic property and antifouling property. The surface of corrugated fin 21 is covered with coating material 27 having hydrophilic property, antifouling property and the like. Coating material 27 will melt under a temperature condition (approximately 600° C.) when a corrugated fin and a flat tube are joined together by brazing.

On the other hand, the temperature for the heat treatment when corrugated fin 21 and flat tube 3 are bonded together with adhesive 41 is approximately 200° C. Accordingly, coating material 27 will not melt, and the hydrophilic property, antifouling property and the like of corrugated fin 21 can be maintained.

When a corrugated fin and a flat tube are to be joined together by brazing, a process of covering the corrugated fin with a coating material is performed after the brazing.

In this case, the coating material needs to be uniformly applied to the corrugated fin, with the corrugated fin being bonded to the flat tube. However, it is difficult to uniformly apply the coating material to the corrugated fin due to limited viscosity of the coating material, resulting in degradation in performance such as hydrophilic property and antifouling property as compared to a corrugated fin covered with a coating material before the bonding.

Particularly, in the case of a heat exchanger of an indoor unit, degradation in hydrophilic property of the surface of a corrugated fin may cause water droplets produced during dehumidification to be detached from the corrugated fin, resulting in the water droplets dropping in a room. Particularly, in the case of a corrugated fin, a heat exchanger has fins arranged in a bellows shape at high density, causing an increase in the amount of water droplets held due to an increase in surface tension. Thus, the water droplets that have adhered to the corrugated fin are more likely to drop in a room.

In the case of a heat exchanger of an outdoor unit, on the other hand, degradation in hydrophilic property of the surface of a corrugated fin may cause degradation in drainage performance during defrosting operation. Thus, heating performance sometimes cannot be fully utilized when the defrosting operation is switched to the heating operation. Moreover, water droplets remaining on the corrugated fin may freeze into ice, in which case the heat exchanger may be damaged. The manufacturing method according to the first embodiment can avoid such problems.

Figure 16:
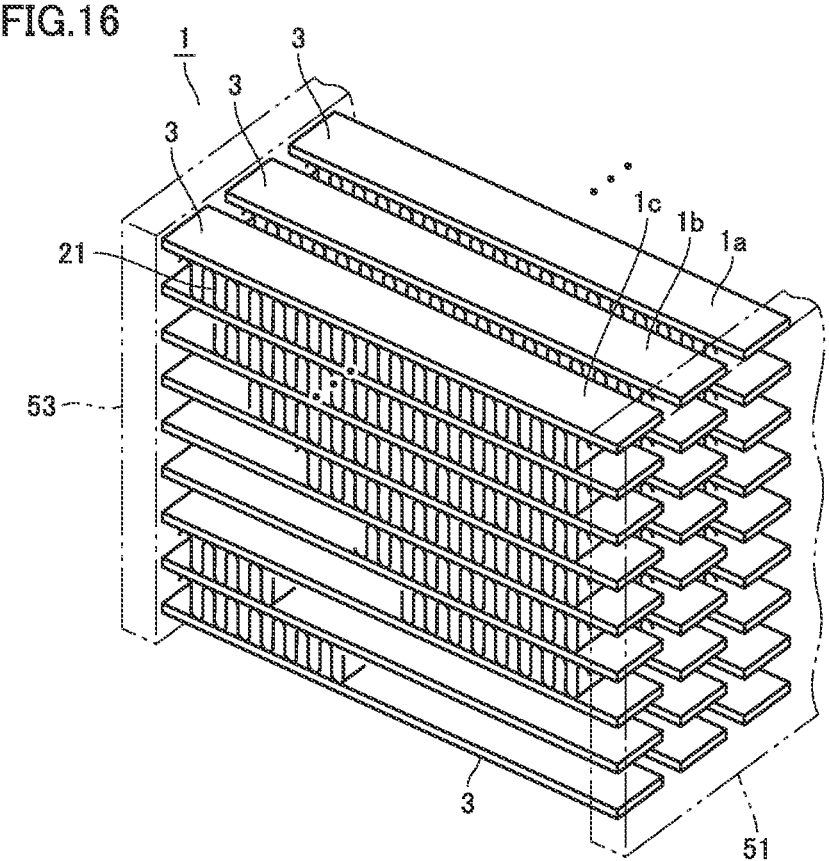
FIG. 16 is a perspective view showing an exemplary heat exchanger having a plurality of the heat exchangers shown in FIG. 2 disposed therein in the same embodiment.

Although only one row of heat exchanger 1 is shown as disposed in heat exchanger 1 described above, multiple-row heat exchanger 1 including two or more rows of heat exchangers 1a, 1b, 1c and the like may be employed as shown in FIG. 16. Such heat exchanger 1 can also be manufactured without a change in manufacturing method for each of heat exchangers 1a, 1b, 1c and the like.

Second Embodiment

Figure 17:
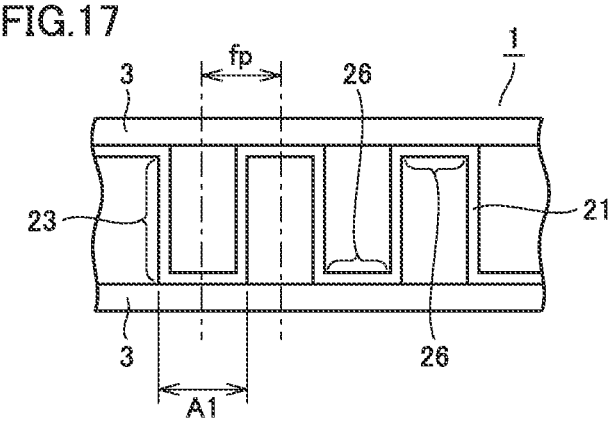
FIG. 17 is a partial enlarged front view of a heat exchanger according to a second embodiment.
Figure 18:
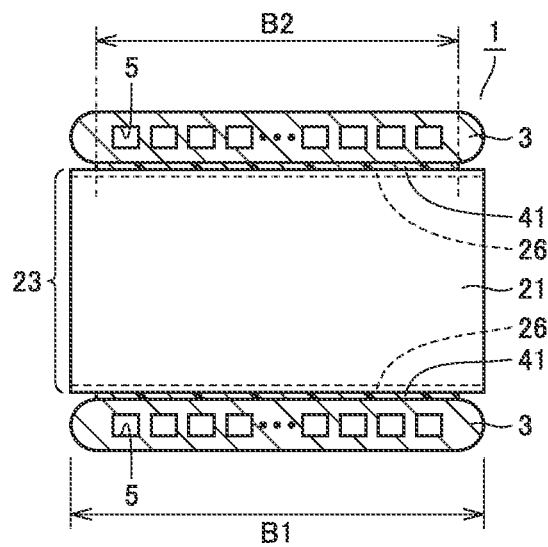
FIG. 18 is a side view including a partial cross section, showing a portion where a corrugated fin and a flat tube are bonded together in the same embodiment.

Here, an exemplary modification of the corrugated fin of the heat exchanger is described. As shown in FIGS. 17 and 18, bellows-shaped corrugated fin 21 in heat exchanger 1 is bent such that planar portion 23 and a planar portion 26 are alternately formed. Planar portion 26 of corrugated fin 21 is bonded with adhesive 41 to flat tube 3. The configuration is otherwise similar to that of the heat exchanger shown in FIGS. 3 to 6, and thus the same components are designated by the same symbols and will not be described repeatedly unless necessary.

In corrugated fin 21 of the heat exchanger described above, the bonding strength can be further increased by the bonding of planar portion 26 to flat tube 3. This is now described.

Figure 19:
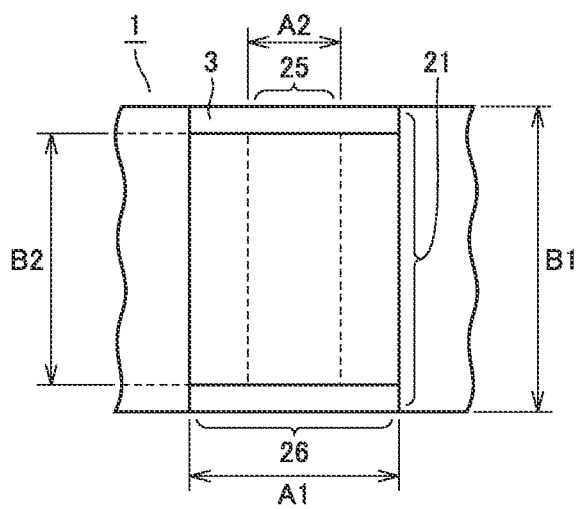
FIG. 19 is a partial plan view illustrating a region where the corrugated fin and the flat tube are bonded together in the same embodiment.

FIG. 19 shows a region where planar portion 26 faces flat tube 3. Here, with regard to the region where planar portion 26 faces flat tube 3, the length of this region in a direction in which flat tube 3 extends is represented as a length A1, and the length of this region in a direction orthogonal to the direction in which flat tube 3 extends is represented as a length B1. Then, with regard to a region where planar portion 26 is bonded to flat tube 3, the length of this region in the direction in which flat tube 3 extends is length A1, which is equal to A1. On the other hand, the length of this region in the direction orthogonal to the direction in which flat tube 3 extends is a length B2 shorter than length B1, because the outer wall curved portion of flat tube 3 is located.

In contrast, in heat exchanger 1 according to the first embodiment, curved portion 25 of corrugated fin 21 is bonded to flat tube 3 (see FIG. 3). Thus, with regard to a region where curved portion 25 is bonded to flat tube 3, the length of this region in the direction in which flat tube 3 extends is a length A2 shorter than length A1. On the other hand, the length of this region in the direction orthogonal to the direction in which flat tube 3 extends is length B2, which is equal to length B2.

Accordingly, in heat exchanger 1 according to the second embodiment, a bonding area S1 between corrugated fin 21 and flat tube 3 is represented as A1×A2.

In heat exchanger 1 according to the first embodiment, on the other hand, a bonding area S2 between corrugated fin 21 and flat tube 3 is represented as A2×B2 (A2<A1). As a result, bonding area S1 is larger than bonding area S2, so that the bonding strength can be improved.

Third Embodiment

Here, as another exemplary modification of the corrugated fin of the heat exchanger, a corrugated fin capable of improving the bonding strength between the corrugated fin and the flat tube is described.

Figure 20:
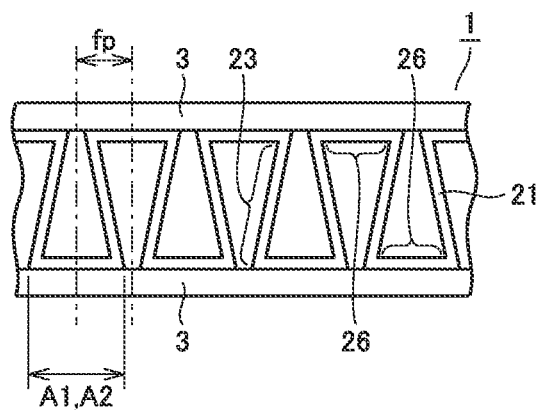
FIG. 20 is a partial enlarged front view of a heat exchanger according to a third embodiment.

As shown in FIG. 20, bellows-shaped corrugated fin 21 in the heat exchanger is bent such that planar portion 23 and planar portion 26 are alternately formed. In particular, planar portion 26 is bonded with adhesive 41 to flat tube 3 in such a manner that adjacent planar portions 26 in corrugated fin 21 are located closest to each other. The configuration is otherwise similar to that of the heat exchanger shown in FIGS. 3 to 6, and thus the same components are designated by the same symbols and will not be described repeatedly unless necessary.

Figure 21:
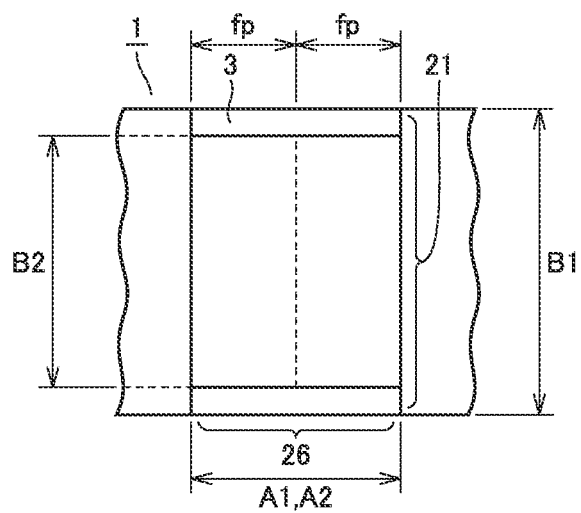
FIG. 21 is a partial plan view illustrating a region where a corrugated fin and a flat tube are bonded together in the same embodiment.

Next, the bonding strength between corrugated fin 21 and flat tube 3 is described. FIG. 21 shows a region where planar portion 26 faces flat tube 3. Here, with regard to the region where planar portion 26 faces flat tube 3, the length of this region in the direction in which flat tube 3 extends is represented as length A1, and the length of this region in the direction orthogonal to the direction in which flat tube 3 extends is represented as length B1.

Then, with regard to a region where planar portion 26 is bonded to flat tube 3, length A2 of this region in the direction in which flat tube 3 extends is equal to length A1. On the other hand, the length of this region in the direction orthogonal to the direction in which flat tube 3 extends is length B2 shorter than length B1, because the outer wall curved portion of flat tube 3 is located.

The area of the region where planar portion 26 faces flat tube 3 is represented as A1×B1. The bonding area of the region where planar portion 26 is bonded to flat tube 3 is represented as A1×B2. When a ratio of the bonding area of the region where planar portion 26 is bonded to flat tube 3 to the area of the region where planar portion 26 faces flat tube 3 is referred to as a bonding area ratio, then the bonding area ratio is represented as (A1×B2)/(A1×B1)=B2/B1.

Figure 22:
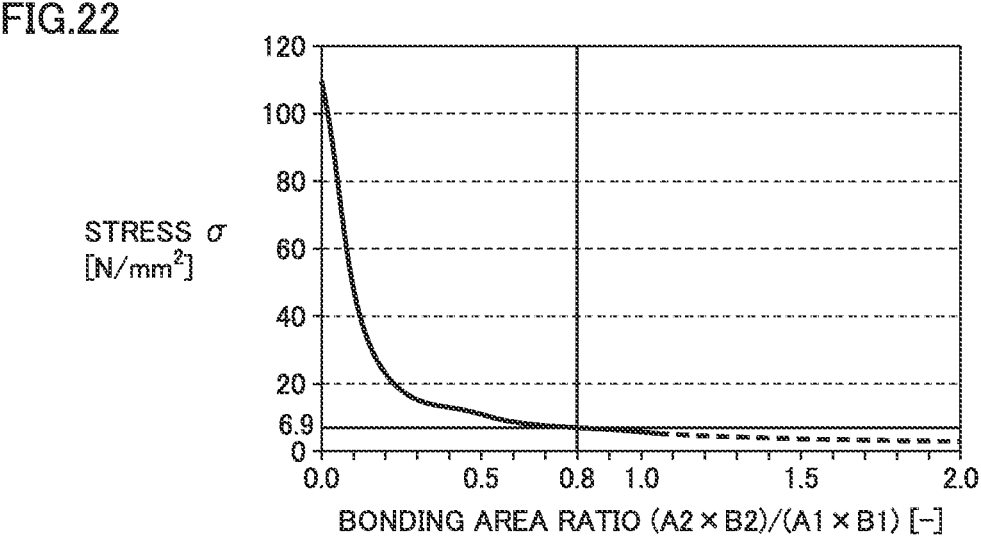
FIG. 22 is a graph showing relation between shear stress and a bonding area ratio in the same embodiment.

Here, FIG. 22 shows relation (graph) between the bonding area ratio, and shear stress acting on the bonding surface between the adhesive and the corrugated fin. It is known that shear stress at which a fin made of aluminum is fractured is $110(N/mm^2)$. According to evaluation by the inventors, it was found that, when the bonding area ratio is not less than approximately 0.8, even when a shear stress of $110(N/mm^2)$ occurs in a direction of air flow, shear stress acting on adhesive 41 generally has a value lower than $6.9(N/mm^2)$, which is the shear stress of an adhesive, so that corrugated fin 21 does not peel from adhesive 41.

Moreover, in corrugated fin 21 of heat exchanger 1 described above, planar portions 26 are bonded with adhesive 41 to flat tube 3 in such a manner that adjacent planar portions 26 are located closest to each other. Thus, when a fin pitch of corrugated fin 21 is represented as fp, length A1 is represented as: length A1=2·fp.

Accordingly, as compared to the heat exchanger described in the second embodiment (see FIG. 17), the bonding area between corrugated fin 21 and flat tube 3 can be increased, to further improve the bonding strength. Moreover, thermal resistance can be reduced. Furthermore, the thickness of adhesive 41 can be reduced, to reduce thermal resistance in a thickness direction of the adhesive. The amount of adhesive 41 used can also be reduced.

Fourth Embodiment

Figure 23:
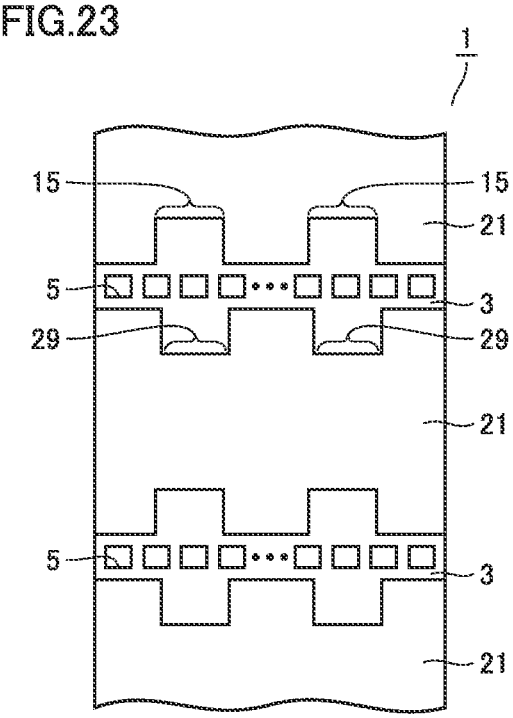
FIG. 23 is a side view including a partial cross section, showing a portion where a corrugated fin and a flat tube are bonded together in a heat exchanger according to a fourth embodiment.

Here, a modification of the corrugated fin and the flat tube is described. As shown in FIG. 23, flat tube 3 is provided with protrusions 15 in a direction intersecting a direction in which refrigerant flow path 5 extends. Corrugated fin 21, on the other hand, is provided with recesses 29 in which protrusions 15 of flat tube 3 fit. The configuration is otherwise similar to that of the heat exchanger shown in FIGS. 3 to 6, and thus the same components are designated by the same symbols and will not be described repeatedly unless necessary. It should be noted that protrusions 15 and recesses 29 are shown in an exaggerated manner for the purpose of illustration.

In the heat exchanger described above, flat tube 3 is provided with protrusions 15, and corrugated fin 21 is provided with recesses 29. Thus, as compared to a heat exchanger not provided with such protrusions and recesses, a bonding distance (area) between corrugated fin 21 and flat tube 3 can be increased, thereby improving the bonding strength.

This method is particularly effective when adhesive 41 susceptible to peeling in a direction of air flow is used as adhesive 41. At least one pair of protrusion 15 and recess 29 in the direction of air flow is enough to obtain a desired effect. In addition, the effect of suppressing the peeling of corrugated fin 21 is obtained even when the protruding length of protrusion 15 (the depth of recess 29) is not more than 1 mm.

Figure 24:
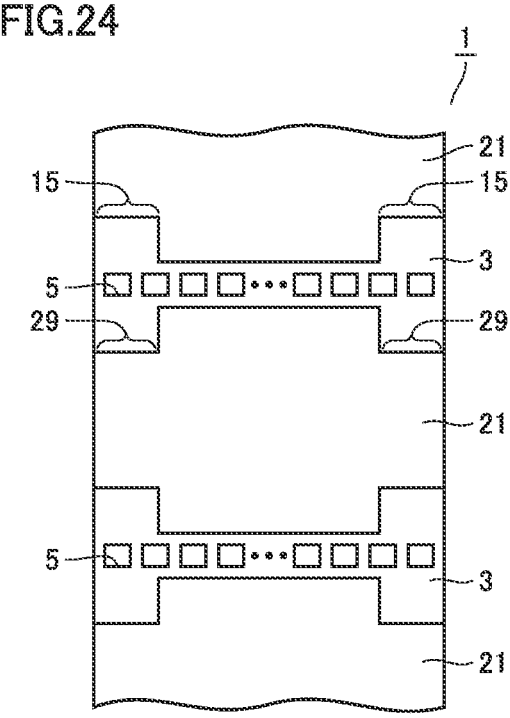
FIG. 24 is a side view including a partial cross section, showing a portion where a corrugated fin and a flat tube are bonded together in a heat exchanger according to a modification in the same embodiment.

In the heat exchanger described above, protrusions 15 have been described as provided at portions in a width direction of flat tube 3. The positions of the protrusions are not limited to such arrangement. For example, protrusions 15 may be provided at one end side and the other end side in the width direction of flat tube 3, respectively, as shown in FIG. 24. The effect of suppressing the peeling of corrugated fin 21 is obtained in this case as well.

Fifth Embodiment

Figure 25:
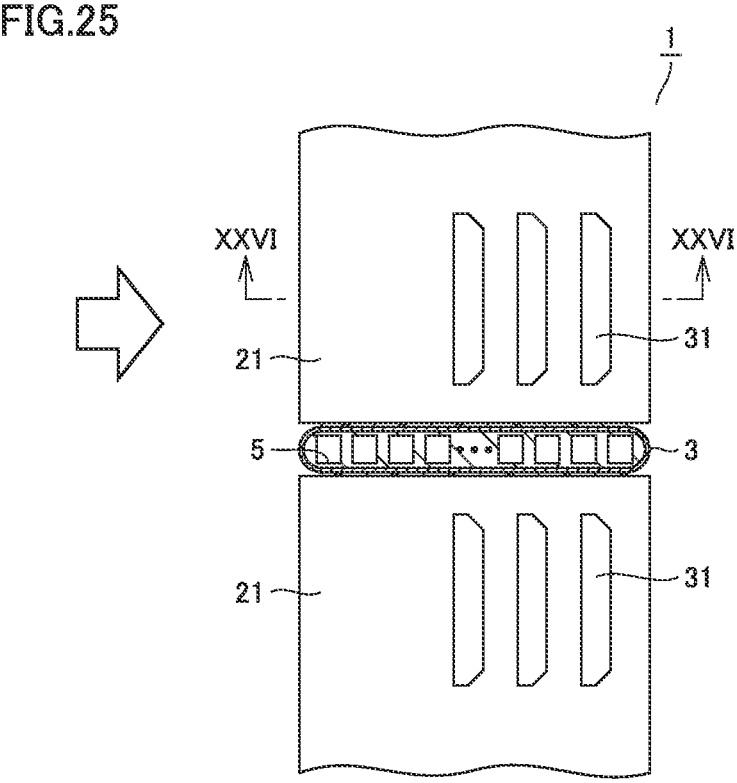
FIG. 25 is a side view including a partial cross section, showing a portion where a corrugated fin and a flat tube are bonded together in a heat exchanger according to a fifth embodiment.
Figure 26:
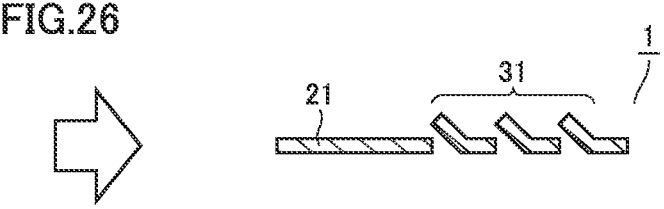
FIG. 26 is a partial cross-sectional view of the corrugated fin taken along the cross-sectional line XXVI-XXVI shown in FIG. 25.

Here, a modification of the corrugated fin is described. As shown in FIGS. 25 and 26, corrugated fin 21 is provided with louvers 31. Double line arrows indicate a direction of air flow. Louvers 31 are disposed on the leeward side, and open toward the windward side. The configuration is otherwise similar to that of the heat exchanger shown in FIGS. 3 to 6, and thus the same components are designated by the same symbols and will not be described repeatedly unless necessary.

Generally, in an outdoor unit of an air conditioner, heat exchange takes place when outdoor air (air) fed into a casing of the outdoor unit passes through a heat exchanger. When the outside air is passing through the heat exchanger, an external force in the same direction as the direction of flow of the outside air tends to act on a corrugated fin. When louvers are disposed on the windward side of the corrugated fin, there is a risk that the external force may break openings in the louvers to close the louvers, resulting in degradation in heat exchange performance.

In contrast, when louvers 31 are disposed on the leeward side, peel strength on the windward side on which the external force acts can be increased, as compared to an example where louvers 31 are disposed on the windward side, thereby suppressing the closing of louvers 31. Thus, the outside air can flow through louvers 31 to easily generate a turbulent flow, thereby further facilitating the heat exchange between the outside air and the refrigerant.

Epoxy resin-based adhesive 41 has been described as an example of the bonding agent in each embodiment. Epoxy resin-based adhesive 41 has excellent heat resistance, water resistance, and stability to chemical materials. Moreover, epoxy resin-based adhesive 41 does not contain volatile organic chemical materials such as formaldehyde which has been identified as a cause of sick house syndrome. Epoxy resin-based adhesive 41 is therefore an adhesive suitable for a heat exchanger used for an indoor unit. Furthermore, epoxy resin-based adhesive 41 also has excellent oil resistance, and therefore can also be applied in a place where oil is frequently used such as a kitchen.

Epoxy resin-based adhesives include a one-component adhesive and a two-component adhesive. In the two-component adhesive, a mixing ratio between epoxy resin and a curing agent may vary. In the one-component adhesive, on the other hand, a curing agent is added to epoxy resin in advance, so that stable bonding strength can be obtained without variation in components.

In addition, epoxy resin-based adhesive 41 has a thermal conductivity (0.6 W/m·k) higher than the thermal conductivities (0.2 to 0.3 W/m·k) of other adhesives such as a nylon-based adhesive or polyester-based adhesive. It can be said also from this fact that epoxy resin-based adhesive 41 is an adhesive suitable for a heat exchanger.

Alternatively, solder may be used, instead of epoxy resin-based adhesive 41, as the bonding agent. In the case of solder, the solder may be formed on the surface of flat tube 3 by plating. In the case of solder, corrugated fin 21 can be bonded with the solder to flat tube 3 under a temperature condition of two hundred and several tens of ° C., and furthermore, coating material 27 coating corrugated fin 21 (see FIG. 4) does not melt.

Moreover, any bonding agent may be used other than the adhesive and the solder, as long as corrugated fin 21 (fin) and flat tube 3 (heat transfer tube) can be bonded together without causing melting of coating material 27 coating corrugated fin 21 (fin).

Although corrugated fin 21 has been described as an example of the fin, a plate-like can also be applied. In this case, it is desirable that a clearance between the flat tube and the fin be set to a minimum value (5 μm) in order to suppress degradation in thermal conductivity caused by an increased thickness of the adhesive.

The heat exchangers described in the respective embodiments can be combined in various ways as needed.

The embodiments disclosed herein are illustrative and non-restrictive. The present invention is defined by the terms of the claims, not the description above, and is intended to include any modifications within the meaning and scope equivalent to the terms of the claims.

INDUSTRIAL APPLICABILITY

The present invention is effectively utilized for a heat exchanger including a fin and a flat tube.

REFERENCE SIGNS LIST

1, 1a, 1b, 1c heat exchanger; 3 flat tube; 5 refrigerant flow path; 7 outer wall planar portion; 9 outer wall curved portion; 11 anticorrosive layer; 12 anticorrosive layer surface; 13 top; 15 protrusion; 21 corrugated fin; 23 planar portion; 25 curved portion; 26 planar portion; 27 coating material; 29 recess; 31 louver; 41 adhesive; 51 inlet side header; 53 outlet side header; 55 refrigerant inlet/outlet; 81 air conditioner; 83 compressor; 85 outdoor unit; 87 expansion valve; 89 indoor unit; 91 four-way valve; 93 outdoor fan; 95 indoor fan; 97 refrigerant pipe; A1, A2, B1, B2 length; fp fin pitch.

The invention claimed is:
1. A heat exchanger comprising:
at least one flat tube having a flat cross-sectional shape and being covered with an anticorrosive layer that is an alloy layer of aluminum and zinc; and
a fin bonded to the at least one flat tube with a bonding agent on a first surface of the anticorrosive layer interposed therebetween, wherein:
the fin is covered with a coating material having a hydrophilic property and an antifouling property,
the first surface of the anticorrosive layer has a roughness,
the bonding agent is fixed to the first surface of the anticorrosive layer having the roughness,
the bonding agent includes an adhesive,
the adhesive includes an epoxy resin-based adhesive,
the fin includes a portion extending as a flat plate along the at least one flat tube, the portion extending as the flat plate is bonded to the at least one flat tube, the at least one flat tube has a width in a first direction and extends in a second direction intersecting the first direction, the at least one flat tube includes one flat tube and another flat tube spaced apart from each other, the fin includes:
- a first flat plate portion extending in the second direction and bonded to the one flat tube;
- a second flat plate portion disposed from one end side of the first flat plate portion in the second direction toward the another flat tube; and
- a third flat plate portion disposed from an other end side of the first flat plate portion in the second direction toward the another flat tube, the second flat plate portion and the third flat plate portion are disposed such that a spacing between the second flat plate portion and the third flat plate portion decreases from the one flat tube toward the another flat tube, an entire surface of the first flat plate portion, excluding an area where the first flat plate portion faces an outer wall curved portion of the flat tube, is rectangularly shaped and is bonded to the one flat tube without an opening, an arithmetic mean of the roughness of the first surface of the anticorrosive layer is not less than 0.7 μm and is not more than 100 μm, and a thickness of the bonding agent from a top of the first surface of the anticorrosive layer having the roughness to an upper surface of the bonding agent is not less than 0.1 μm and is not more than 5.0 μm.

2. The heat exchanger according to claim 1, wherein when
- a length in the second direction over which the fin and the at least one flat tube are in contact with each other is represented as a length A1,
- a length in the second direction of a portion where the fin and the at least one flat tube are bonded together with the bonding agent is represented as a length A2,
- a length in the first direction over which the fin and the at least one flat tube are in contact with each other is represented as a length B1,
- a length in the first direction of the portion where the fin and the at least one flat tube are bonded together with the bonding agent is represented as a length B2, and
- a bonding area ratio is represented as (A2×B2)/(A1×B1), then the bonding area ratio is greater than 0.8.

3. The heat exchanger according to claim 1, wherein:
the at least one flat tube is provided with a first protrusion-recess portion, and
the fin is provided with a second protrusion-recess portion in which the first protrusion-recess portion fits.

4. The heat exchanger according to claim 1, wherein the fin is provided with a louver located on a leeward side.

5. The fin and the flat tube according to claim 2, wherein the length B2 is shorter than the length B1.

* * * * *